United States Patent [19]

Bahr et al.

[11] Patent Number: 4,538,264
[45] Date of Patent: Aug. 27, 1985

[54] SELF-REPAIRING RING COMMUNICATIONS NETWORK

[75] Inventors: Richard G. Bahr, Framingham; Russell L. Moore, Hudson, both of Mass.

[73] Assignee: Prime Computer, Inc., Natick, Mass.

[21] Appl. No.: 466,108

[22] Filed: Feb. 14, 1983

[51] Int. Cl.³ .............................................. G06F 11/20
[52] U.S. Cl. .......................................... 371/8; 371/11
[58] Field of Search ..................... 371/8, 11; 364/900, 364/200; 370/86, 16, 87; 340/825.06, 825.01, 825.26, 825.61

[56] References Cited

U.S. PATENT DOCUMENTS

| Re. 28,958 | 9/1976 | Zafiropulo et al. | 340/825.01 |
|---|---|---|---|
| 4,009,469 | 2/1977 | Boudreau et al. | 371/8 |
| 4,075,440 | 2/1978 | Laubengayer | 371/11 |
| 4,159,470 | 6/1979 | Strojny et al. | 371/8 |
| 4,304,001 | 12/1981 | Cope | 371/8 |
| 4,354,267 | 10/1982 | Mori et al. | 371/11 |
| 4,410,983 | 10/1983 | Cope | 371/8 |

OTHER PUBLICATIONS

Andrew et al., "Recovery From Transmission Medium Failure in a Ring", IBM Tech. Disclosure Bulletin, vol. 26, No. 2, 7/83.
Paulish D. J., A Fail-Soft Distributed Processing Sys., Burroughs IEEE, 1980, (pp. 179–184).

*Primary Examiner*—Michael R. Fleming
*Attorney, Agent, or Firm*—Lahive & Cockfield

[57] ABSTRACT

A ring communications system having a double ring format where the integrity of both rings is continuously checked, and where repair of the network is automatically accomplished upon the detection of the return to operation of a defective ring.

2 Claims, 8 Drawing Figures

LEFT OK AND RIGHT OK
"NORMAL" CONDITION

LEFT OK AND RIGHT NOT OK
ISOLATE FAILURE ON RIGHT

LEFT NOT OK AND RIGHT OK
ISOLATE FAILURE ON LEFT

LEFT NOT OK AND RIGHT NOT OK
LOCAL CLUSTER TRAFFIC ONLY

LEFT OK AND RIGHT OK
LOCAL CLUSTER NOT OK

SELF-REPAIRING RING COMMUNICATIONS NETWORK

REFERENCE TO RELATED APPLICATION

This application is related to U.S. Pat. application Ser. No. 466,108, filed on even date herewith and entitled "Reconfigurable Ring Communications Network".

FIELD OF THE INVENTION

The present invention is in the field of data communications, and more particularly relates to ring communications networks.

Ring communications networks generally include a plurality of terminals coupled in series along a unidirectional signal path. In such communications rings, any of the terminals coupled to the ring may transmit or receive data on the ring according to a ring protocol. Ring communication systems are relatively efficient to implement in terms of modularity, costs, and logical complexity. However, such systems are often subject to failure, principally due to a single failure or fault along the ring. There have been several approaches in the prior art to minimize the effects of this problem which utilize a pair of oppositely directed ring communication paths. See, for example, U.S. Pat. No. Re. 28,958, and D. J. Paulish, "A Fail-Safe Distributed Processing System", IEEE. The systems disclosed by these references incorporate a pair of oppositely directed ring signal paths, with associated means for detecting failure of one of the paths and then switching their transmission to the other path, circumventing the failure point. While these references disclose methods of bypassing fault areas (and detecting times of failure), it should be noted that the process of repair of the overall network once the fault has been corrected, has not been approached or resolved in the prior art.

It is an object of the present invention to provide a twin ring communications network having automatic reconfiguration and repair following fault correction.

It is another object to provide a twin ring communications network in which isolated segments of the ring may be operated independently from a faulty ring.

SUMMARY OF THE INVENTION

Briefly, the present invention is directed to a ring communications network. The network includes a pair of oppositely directed, substantially parallel signal paths with a plurality of interface units (IU's) coupled in series along the pair of signal paths. Each IU has two nearest neighbor IU's on the serially connected ring. Each local IU thus has an inbound and outbound signal path coupled to a neighbor IU on one side (e.g. right), and an inbound and an outbound signal path coupled to a neighbor IU on the other side.

Each local IU includes a detector for determining when the two inbound signal paths coupled to that IU are operative. In response to that detection, the IU couples the inbound signal paths to the outbound signal paths so that a signal from the neighbor on one side of the local IU is coupled to the neighbor on the other side of the local IU.

The local IU further includes a detector for determining when an inbound signal path coupled to that IU is inoperative. In response to such a detection, the other inbound signal path is coupled to its parallel outbound signal path so that signals received from its neighbor IU are reflected back to that neighbor IU. Thus, when for example, an inbound signal path to a local IU has failed or the neighbor IU upstream from that signal path has failed, the local IU automatically caps the twin ring signal paths coming from its other neighbor IU. A similar operation occurs at an IU on the other side of the fault, so that a ring is established in the fault-free portions of the twin ring network.

When such a reconfiguration is performed (due to detection of a fault on one of the inbound signal paths), a reconnect network becomes automatically operative. The reconnect network periodically transmits a reference signal on the outbound signal path in the direction of the fault, i.e. along the outbound signal path parallel to the inoperative inbound signal path. The period of this reconnect attempt is denoted $T_0$. The reference signal has a duration of at least $T_1$, where $T_1$ is less than $T_0$.

The reconnect network also includes a monitor for the inoperative inbound signal path. In response to the detection of a reference signal on that signal path, the reconnect network controls the reference signal to continue to be transmitted. If no reference signal is detected, the transmission is terminated after the $T_1$ period.

The reconnect network is further operative for a duration $T_2$ following the detection of the reference signal on the inoperative inbound signal path to determine whether the detected reference signal has a duration at least equal to $T_2$, where $T_2$ is greater than $T_1$ and $T_2$ is less than $T_0$. In response to this determination, the reconnect network determines that the fault has been corrected, and re-couples the "inoperative" inbound signal paths to an outbound signal path.

Thus, for a local IU, when there are no faults detected to the "right" or "left", the IU receives and passes through signals on the inbound signal paths from its right and left. However, in response to a detection of a loss of integrity of the data path on one of those inbound signal paths (due either to a failure in the medium itself, or in an upstream IU) the IU automatically "caps" the operable portion of the network. While the operable portion is capped, the IU periodically checks to determine whether or not the fault has been corrected, and if so, reconfigures the overall system by uncapping the previously capped portion and returning the network to its original operative state.

In another form of the present invention, a ring communciations network includes a plurality of cluster interface units (CIU's), where each cluster interface unit (CIU) is coupled to a unidirectional, open loop signal path having one or more terminals coupled in series along that loop signal path. Each CIU includes an input port and an output port respectively coupled to corresponding input and output ports of the open loop signal path.

The network includes a corresponding plurality of ring interface units (RIU's) where each RIU is associated with one of the CIU's.

The network further includes a corresponding plurality of pairs of oppositely directed, unidirectional, substantially parallel signal path segments. Each of the signal path segments extends between and couples two adjacent RIU's so that each RIU is coupled to a first neighbor RIU by one pair of signal paths and a second neighbor by another pair of signal paths. For a local RIU, the first of the two pairs of signal path segments coupled to the RIU provides a first inbound path segment for that local RIU. The second of the two pairs coupled to the RIU provides a second inbound path segment to that local RIU and a substantially parallel first outbound path segment to that RIU. The first pair also provides a second outbound path segment to that local RIU which is substantially parallel to the first inbound path segment.

Each of the RIU's includes a detector for determining the presence or absence of predetermined signals on the first and second inbound path segments coupled to that RIU. These signals may be carrier signals in a modulated carrier system, or may be synchronization characters in a base band system. In alternative systems, a differential Manchester coding may be used, thereby providing the predetermined signal. In still other systems, separate pilot tones may be used. In response to such detection, one of four control signals is generated. For a modulated carrier system, the first of the four control signals is representative of the detection of the presence of a carrier signal on both the first and second inbound path segments. The second control signal is representative of the detection of the presence of a carrier signal on the first inbound path signal and the absence of such a carrier signal on the second inbound path segment. The third control signal is representative of the detection of the absence of a carrier signal on the first inbound path segment and the presence of a carrier signal on the second inbound path segment. The fourth control signal is representative of the absence of a carrier signal on both of the first and second inbound path segments.

The RIU further includes a selectively operable network which is responsive to the first control signal for coupling the associated CIU input port to the first inbound path segment and for coupling the associated CIU output port to the first outbound path segment, and for coupling the second inbound path segment to the second outbound path segment.

The RIU is selectively operable in response to the second control signal for coupling the associated CIU input port to the first inbound path segment and for coupling the associated CIU output port to the second outbound path segment.

The RIU is selectively operable in response to the third control signal for coupling the associated CIU input port to the second inbound path segment and for coupling the associated CIU output port to the first outbound path segment.

The RIU is further selectively operable in response to the fourth control signal for coupling the associated CIU input port to the associated CIU output port.

With this configuration, the RIU may detect faults in the ring communications network and isolate those faults by reconfiguring the network so that a communications ring is established excluding the fault areas. This process is performed automatically. Furthermore, the RIU is expressly adapted to identify when faults exist both to the left and right of that RIU, and in such cases to automatically cap, or close, the loop which is coupled to the CIU, thereby permitting the cluster of terminals coupled to that loop to operate in a ring configuration, independent of these faults on the overall inter-RIU twin ring network. This latter configuration is particularly important in distributed networks where relatively high terminal densities are provided in clusters coupled by way of CIU's and RIU's.

In addition, the present invention periodically (and automatically) determines whether faults have been corrected and at such points in time reconfigures the network to the original state.

In all of the forms of the invention, terminals may also be coupled to the networks so that data may be entered and removed from the network in a conventional manner.

BRIEF DESCRIPTION OF THE DRAWINGS

The foregoing and other objects of this invention, the various features thereof, as well as the invention itself, may be more full understood from the following description, when read together with the accompanying drawings, in which.

DESCRIPTION OF THE PREFERRED EMBODIMENT

Figure 1:
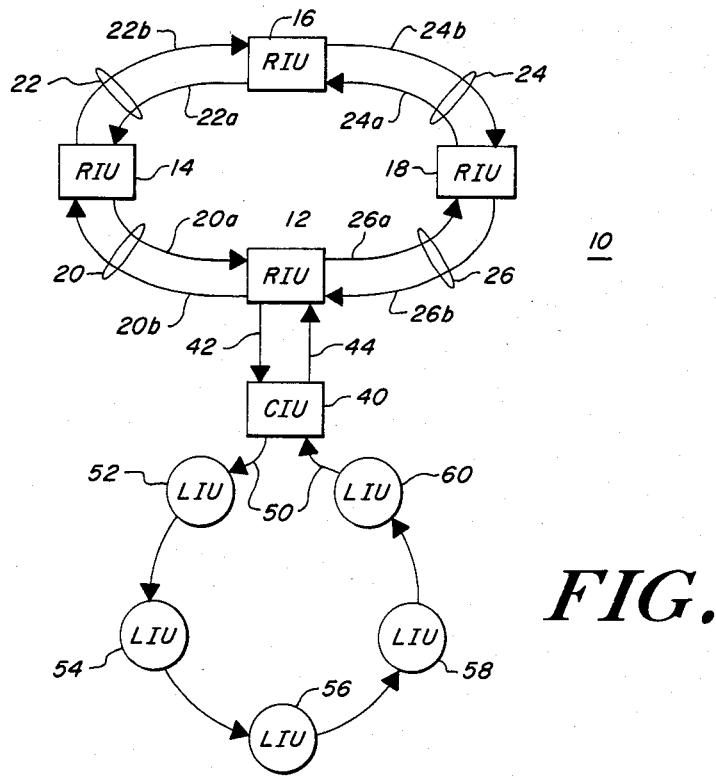
FIG. 1 shows in block diagram form an exemplary ring communications network in accordance with the present invention.

FIG. 1 shows a ring communications network 10 in accordance with the present invention. The exemplary network 10 includes four ring interface units (RIU's) 12, 14, 16 and 18. Four pairs of oppositely directed, unidirectional signal path segments 20, 22, 24 and 26 extend between and couple the respective RIU's. The segments of each pair are denoted in FIG. 1 with the reference designation for the pair plus a subscript "a" or "b". As shown, the "a" segments form a counter clockwise "ring" and the "b" segments form a clockwise ring.

The RIU 12 is coupled to RIU 14 by an inbound path segment 20a and a substantially parallel outbound path segment 20b. RIU 12 is also coupled to RIU 18 by an inbound path segment 26b and a substantially parallel outbound path segment 26a. Each of the other RIU's is similarly configured.

In the present embodiment, the network 10 is a modulated carrier system where the "a" and "b" signal path segments are each channels on a single broadband cable.

Different signal path media may be used such as optical fibers, or the like.

In the present embodiment, network 10 further includes a cluster interface unit 40 having an input port 42 and an output port 44 coupled to the RIU 12. There may be additional similar CIU's at other RIU's in other embodiments. The CIU 40 has its respective input and output ports 42 and 44 coupled by a unidirectional open loop signal path 50 with five loop interface units (LIU's) 52, 54, 56, 58 and 60 coupled in series along the loop signal path 50. Generally, the LIU's may access the path 50, for example, as in a token-passing ring communications network. Additional devices may be coupled to the various LIU's.

The RIU 12, as described in detail below, is adapted to detect the presence or absence of a carrier signal on its inbound path segments 20a and 26b.

In response to that detection, the RIU 12 generates one of four control signals C1, C2, C3 and C4. The control signal C1 is representative of the detection of the presence of a carrier signal on both inbound path segments 20a and 26b. The second control signal C2 is representative of the detection of the presence of the carrier signal on path segment 20a and the absence of a carrier signal on path 26b. The third control signal C3 is representative of the detection of the presence of a carrier on path segment 26b and the absence of a carrier signal on path segment 20a. The fourth control signal C4 is representative of the detection of the absence of the carrier signal on both of the path segments 20a and 26b. C2, C3 and C4 are indicative of a fault, and, once generated, remain in efrect until the fault is no longer present.

Figure 2:
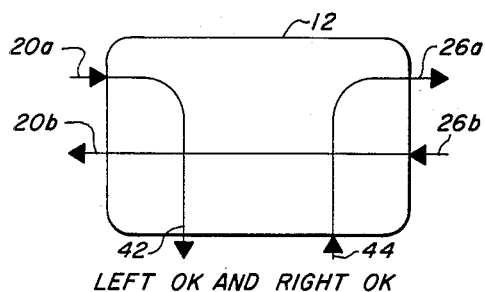
FIGS. 2-5 illustrate the functional interconnections of the signal paths of the network of FIG. 1.

After RIU 12 determines which control signal is appropriate for the current state of the network 10, RIU 12 then controls a switching interconnection of the signal paths 20 and 26 as shown functionally in FIGS. 2-5 in accordance with those control signals C1-C4, respectively. As shown in FIG. 2, the path segments 20b and 26b are directly coupled, and the inbound path segment 20a is coupled to input port 42 of CIU 40 and the output port 44 of CIU 40 is coupled to the outbound patn 26a. In this configuration, the loop 50 and the LIU's are coupled in series with the path segments 26a and 20a. This represents "normal" (fault-free) operation of the network 10, with respect to RIU 12.

Figure 3:
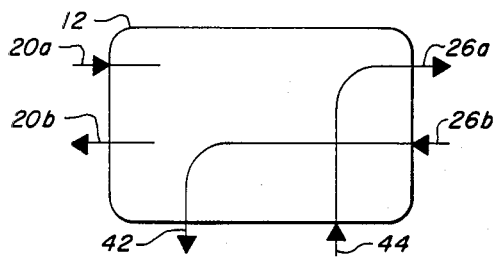

As shown in FIG. 3, in response to control signal C3, inbound path 26b is coupled to input port 42 and output port 44 is coupled to outbound path segment 26a. Carrier is suppressed on path 20b. Thus, the paths 20a and 20b are decoupled. The control signal C3 indicates a failure to detect carrier on line 20a, and thus indicates a fault in that direction, i.e., to the "left" of RIU 12. In this configuration, the loop 50 in effect caps the end of the loop so that inbound signals on path 26b are passed around the loop 50 and back to the outbound path 26a. A similar operation will occur at another RIU in network 10 to cap paths 26a and 26b to the right (as shown) of RIU 12, thereby forming a communications ring excluding the faulty link.

Figure 4:
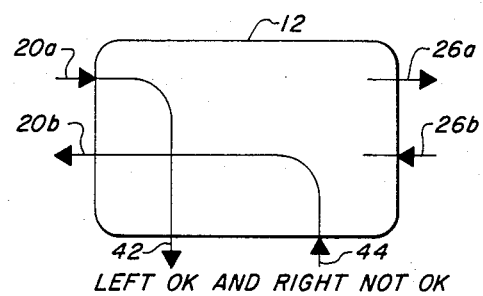

As shown in FIG. 4, in response to control signal C2, RIU 12 operates in a similar manner to that described just above in FIG. 3, except that inbound path 20a is coupled to the input port 42 and the output port 44 is coupled to the outbound path 20b. The central signal C2 indicates a fault to the "right" of RIU 12. In this configuration, loop 50 caps the signal path 20a and 20b. Carrier is suppressed on path 26a. Again, in this case, another RIU in network 12 would cap (as shown in FIG. 3) the other paths 20a and 20b to the left (as shown) of RIU 12 to establish a communications ring excluding the faulty link.

Figure 5:
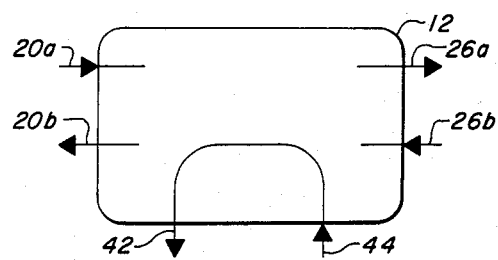

As shown in FIG. 5, in response to control signal C4, which is indicative of faults to the left and to the right of RIU 12, the RIU 12 isolates both sets of paths 20a and 20b and paths 26a and 26b, and couples the output port 44 to the input port 42, to complete a ring communication path for loop 50. Carrier is suppressed on both paths 20b and 26a. In this configuration, even though RIU 12 is isolated from the remaining portions of network 10 by apparent faults, the loop 50 coupled through CIU 40 may still provide an operative ring for the terminals 52, 54, 56, 58 and 60.

Figure 6:
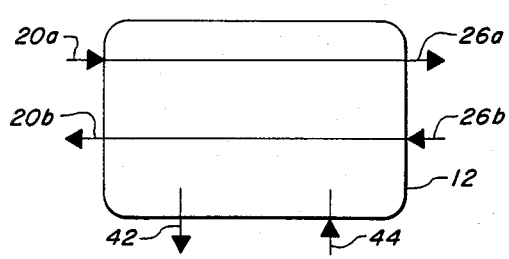
FIG. 6 illustrates a functional interconnection of the signal paths of an alternative network configuration embodying this invention.

In alternative embodiments, the RIU 12 may also detect the presence or absence of a carrier signal coming from the output port 44. In such cases, the RIU 12 may determine whether or not the loop 50 and its associated terminals are operative and whether or not those may be independently isolated from the remaining portion of network 10. FIG. 6 illustrates the configuration of RIU 12 in this case, where an absence of carrier is determined from port 44 only, and the RIU 12 thereupon directly couples signal paths 20a and 26a, and also signal paths 26b and 20b, thereby isolating the "fault" in the loop 50 cluster configuration.

Thus, with the present configuration, two counter-rotating data flow loops are connecting the respective RIU's, at nodes in the system. When all elements are functional, one of the loops is used for modulated carrier communication while the other loop may be used for carrier only around the system. The respective RIU's continuously monitor their respective loops for integrity. When a failure of a node or the interconnecting signal path occurs, the failed element is isolated and the remaining elements are used to establish a ring (using the "carrier only" loop segments). As will be described more fully below, in the presence of a failure of an element and ring reconfiguration, the respective RIU's continuously monitor the failed element to determine when that element has reverted back its operative state, and upon such detection, re-establish the network in its original form.

Figure 7:
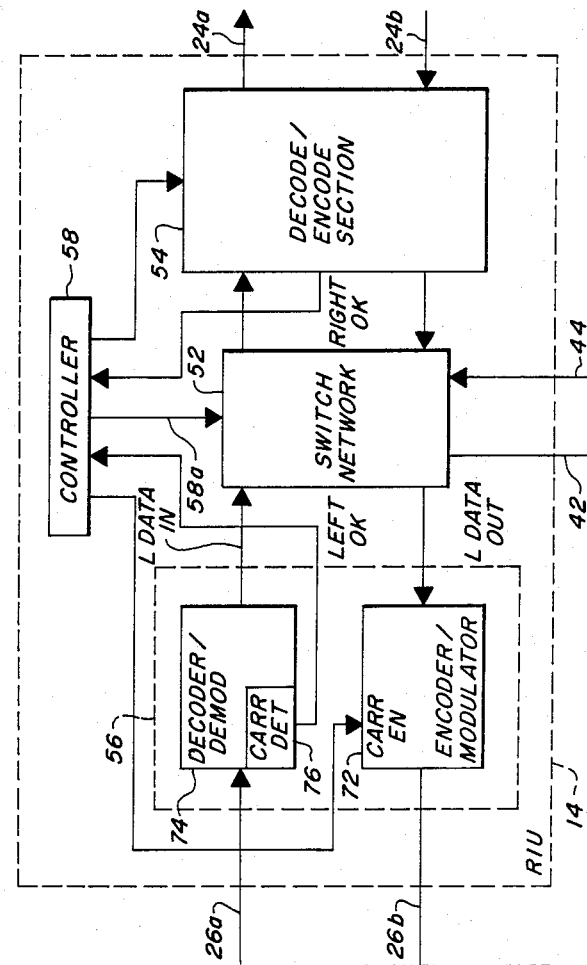
FIG. 7 shows, in block diagram form, an exemplary pair of adjacent ring interface units in a carrier-based ring network in accordance with the present invention.
Figure 7:
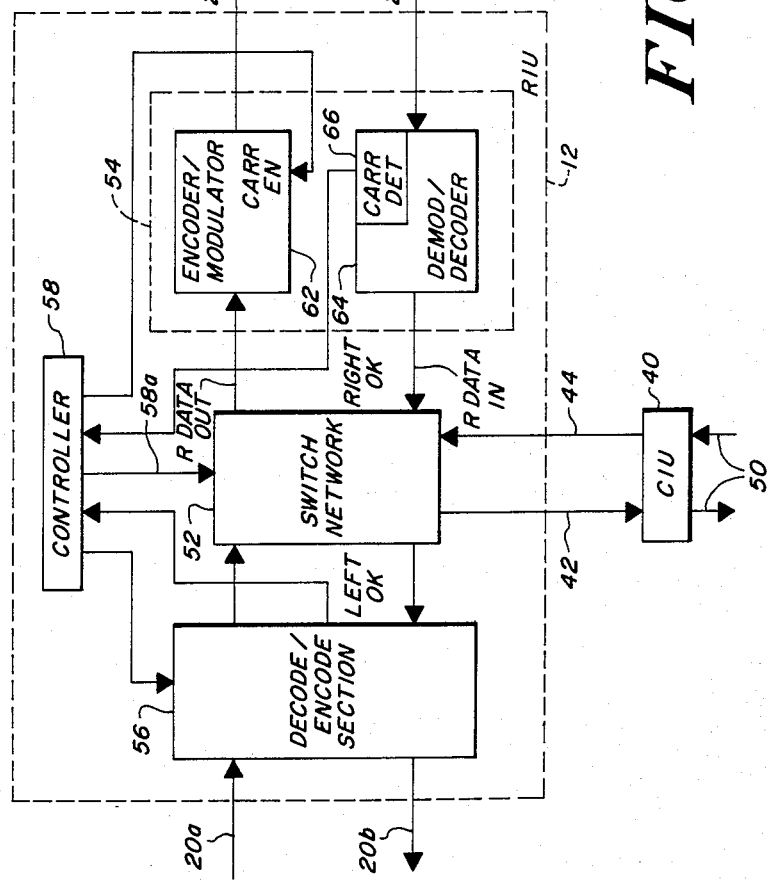

FIG. 7 shows adjacent RIU's 12 and 14 in the network 10. Each of the RIU's 12 and 14 includes a switch network 52, an encode/decode section 54, a decode/encode section 56 and a controller 58. The controller 58 determines the appropriate control signal for the respective RIU in the manner described. The switch network 52 functions as described above in conjunction with FIGS. 2-6 in response to a control signal applied by controller 58 by way of line 58a. The encode/decode section 54 of each RIU includes an encoder (and associated modulator) 62 and a decoder (and associated demodulator) 64. The decoder 64 includes an associated carrier detection network 66. The decode/encode section 56 includes a decode (and associated demodulator) 74 and an encoder (and associated modulator) 72. The decoder 74 includes an associated carrier detector 76.

In the illustrated configuration, with no faults in network 10, the "a" loop is a "data" loop while the "b" loop is a "carrier only" loop.

In Section 54, each encoder 62 includes a carrier enable input. The carrier enable input is coupled to controller 58 to control the transmission of modulated carrier on line 26a.

In the present embodiment, each decoder 64 includes a carrier detector 66 which drives its output to a "one" state when carrier is detected on the inbound signal path 26b coupled to that decoder.

In section 56, each encoder 72 is substantially the same in structure and function as encoder 62. The decoder 74 is also similar in structure and function to decoder 64.

This configuration operates in a reconnect mode in the RIU's when one or more of the inbound signal paths is inoperative, i.e. when a fault has been detected and thus C2, C3, or C4 exist. Under the control of controller 58 in that reconnect mode, a periodic succession of reconnect initiate signals is generated with a repetition period $T_0$. In response to each reconnect initiate signal, a reference carrier signal is transmitted on the outbound signal path parallel to that RIU's faulty inbound signal path. For example, where the inbound path 26a is determined by RIU 14 to have no carrier present, the controller 58 in RIU 14 causes its switch network 52 to be configured as shown on FIG. 3, thereby suppressing carrier on line 26b. In response, controller 58 in RIU 12 causes its switch network 52 to be configured as shown in FIG. 4, completing a reconfigured ring. The RIU's 12 and 14 each direct the transmission of reference carrier signals on paths 26a and 26b respectively, that is, towards RIU 14 and 12, respectively. Reference carrier signal is maintained for a duration at least equal to $T_1$, where $T_0$ is greater than $T_1$.

Each of the RIU's in the reconnect mode monitors any inbound signal path which has been determined to be inoperative. Again, continuing with the above example for RIU's 12 and 14, RIU 12 monitors its inbound path 26b and RIU 14 monitors its inbound path 26a. When the reference carrier signal is detected on the path 26b, the controller 58 of RIU 12 directs encoder 62 to continue transmitting the reference carrier signal on the output path parallel to that inoperative inbound signal path, i.e. path 26a. Where no reference carrier signal is detected, then controller 58 of RIU 12 controls encoder 62 to terminate the transmission of the reference carrier signal after the $T_1$ period. The controller 58 of RIU 12 further is operative for a period of duration $T_2$ following detection of the reference carrier signal on line 26b, for determining whether that detected carrier has a duration at least equal to $T_2$. Following the determination by controller 58 of RIU 12 that the $T_2$ condition is met, the paths 26a and 26b are confirmed to be operative, and a new control signal (C1, C2, C3, or C4) is generated representative of the current state of RIU 12 where $T_2$ is greater than $T_1$ and $T_2$ is less than $T_0$. Controller 58 of a RIU 14 operates in a similar manner.

If the $T_2$ condition is not met, at intervals of $T_0$ duration, RIU 12 continues to attempt to verify whether or not the signal paths 26a and 26b have been repaired. It will be understood that if an RIU farther around the network 10 from RIU 14, for example, RIU 16, detects a fault, similar operation may occur at that RIU, and differing length rings may be established along the network 10 around isolated faults.

With this configuration, automatic reconfiguration around a failed element in the network is provided without necessitating software involvement. The reconfiguration activity may in some instances cause loss of packets, tokens or other elements of the message protocol. While this reconfiguration activity is automatic, error detection status and resultant reconfiguration states may be reported to higher level software. Override mechanisms may be provided to allow software to manipulate reconfiguration or force error conditions as desired, or for diagnostic purposes.

Figure 8:
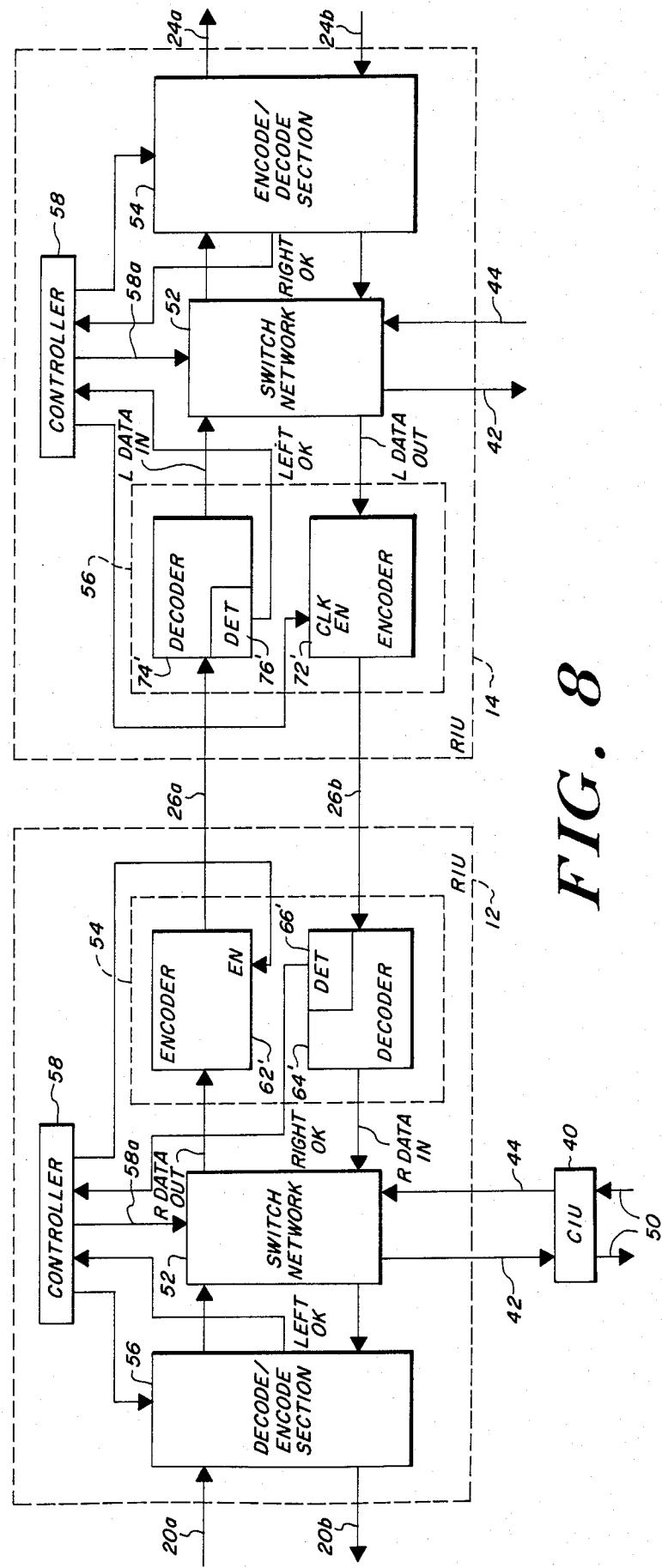
FIG. 8 shows, in block diagram form, an exemplary pair of adjacent ring interface units in a baseband ring network in accordance with the present invention.

FIG. 8 shows adjacent RIU's 12 and 14 which are adapted for use in a baseband form of the invention. In FIG. 8, the RIU's 12 and 14 are substantially similar to those in the FIG. 7 configuration, except that the encoders 62', 72' and decoders 64', 74' do not include modulators and demodulators. Moreover, the carrier detectors 66 and 76 are replaced by transition detectors 66', 76' (for an RZ code implemented system) respectively. In FIG. 8, functional similar elements to those in FIG. 7 are denoted by identical reference designations. The fault isolation and reconfiguration operation of the baseband system of FIG. 8 is substantially the same as that of FIG. 7, except that the carrier detection operation is replaced by transition detection, and the carrier enable function is replaced by the transmit enable function.

The invention may be embodied in other specific forms without departing deom the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A ring communications network comprising
a pair of oppositely directed, unidirectional, substantially parallel signal paths having a plurality of interface units (IU's) coupled in series along said pair of signal paths, whereby each IU is coupled to one inbound signal path and one outbound signal path from each of said parallel signal paths, wherein each of said IU's includes:
    A. first detecting means for detecting when the two inbound signal paths coupled to that IU are operative and means responsive to said detection for coupling each of said inbound signal paths to the respective outbound signal path coupled to that IU which is parallel to the other inbound signal path,
    B. second detecting means for detecting when one inbound signal path coupled to that IU is inoperative and means responsive to said detection for interrupting signal flow on the outbound signal path parallel to said one inbound signal path, and means for coupling the other inbound signal path to the outbound signal path parallel to said other inbound signal path,
    C. reconnect network responsive to said second detecting means and operative when one of said inbound signal paths is inoperative, said reconnect network including means for periodically monitoring said inoperative inbound signal path, and including means for determining when said inoperative inbound signal path is again operative and, in response thereto for coupling said again operative inbound signal path to the outbound signal path at said IU which is parallel to the other inbound signal path at said IU and for coupling said other inbound signal path at said IU to the outbound signal path which is parallel to said again operative inbound signal path.

2. A ring communications network according to claim 1 wherein said reconnect network comprises:
means for generating a periodic succession of reconnect initiate signals with a repetition period $T_0$,
transmitter means responsive to each of said initiate reconnect signals for commencing the transmission of a reference signal on the outbound signal path parallel to that IU's inoperative inbound signal path, said reference signal having a duration at least equal to $T_1$, where $T_0$ is greater than $T_1$,
means operative following each reconnect initiate signal for monitoring said inoperative inbound signal path and for detecting a reference signal thereon, and means responsive to said detection for controlling said transmitter means to continue said transmission of said reference signal, and otherwise for controlling said transmitter means to terminate said transmission of said reference signal after the $T_1$ period, means operative for a period of duration $T_2$ following said detection for determining whether said detected reference signal has a duration at least equal to $T_2$, where $T_2$ is greater than $T_1$ and $T_2$ is less than $T_0$, said determination being indicative that said inoperative inbound path is again operative, and reconnect means, said reconnect means being operative in response to said determination that said reference signal has a duration t least equal to $T_2$ for coupling said again operative inbound signal path to the outbound signal path which is parallel to the other inbound signal path and for coupling said other inbound signal path to the outbound signal path which is parallel to said again operative inbound signal path, and said reconnect means being inoperative otherwise.

* * * * *

UNITED STATES PATENT AND TRADEMARK OFFICE
CERTIFICATE OF CORRECTION

PATENT NO. :   4,538,264

DATED      :   August 27, 1985

INVENTOR(S) :  Richard G. Bahr and Russell L. Moore

It is certified that error appears in the above-identified patent and that said Letters Patent is hereby corrected as shown below:

Column 1, line 7:   change "Ser. No. 466,108" to read --Ser. No. 466,080--.

Column 5, line 26:  change "patn" to read --path--.

Column 5, line 15:  change "efrect" to read --effect--.

Signed and Sealed this

Twenty-second Day of July 1986

[SEAL]

Attest:

DONALD J. QUIGG

Attesting Officer

Commissioner of Patents and Trademarks